United States Patent
Hahm et al.

(10) Patent No.: US 8,861,600 B2
(45) Date of Patent: Oct. 14, 2014

(54) METHOD AND SYSTEM FOR DYNAMICALLY CONFIGURABLE DCT/IDCT MODULE IN A WIRELESS HANDSET

(75) Inventors: Mark D. Hahm, Hartland, WI (US); Li Fung Chang, Holmdel, NJ (US)

(73) Assignee: Broadcom Corporation, Irvine, CA (US)

(*) Notice: Subject to any disclaimer, the term of this patent is extended or adjusted under 35 U.S.C. 154(b) by 2643 days.

(21) Appl. No.: 10/890,865

(22) Filed: Jul. 14, 2004

(65) Prior Publication Data
US 2005/0281331 A1    Dec. 22, 2005

Related U.S. Application Data

(60) Provisional application No. 60/581,150, filed on Jun. 18, 2004.

(51) Int. Cl.
| | |
|---|---|
| H04N 7/12 | (2006.01) |
| H04N 19/186 | (2014.01) |
| H04N 19/159 | (2014.01) |
| H04N 19/60 | (2014.01) |
| H04N 19/12 | (2014.01) |
| H04N 19/126 | (2014.01) |
| H04N 19/122 | (2014.01) |
| H04N 19/42 | (2014.01) |

(52) U.S. Cl.
CPC ... H04N 19/00096 (2013.01); H04N 19/00315 (2013.01); H04N 19/00218 (2013.01); H04N 19/00775 (2013.01); H04N 19/00078 (2013.01); H04N 19/00084 (2013.01); H04N 19/00478 (2013.01)
USPC .................................................. 375/240.16

(58) Field of Classification Search
CPC ............ H04N 19/00315; H04N 19/00084; H04N 19/00218; H04N 19/00096; H04N 19/00078; H04N 19/00775
USPC ............... 375/240.12, 240.03; 708/402
See application file for complete search history.

(56) References Cited

U.S. PATENT DOCUMENTS

| | | | | |
|---|---|---|---|---|
| 5,253,078 A * | 10/1993 | Balkanski et al. | ............ | 382/250 |
| 5,565,920 A * | 10/1996 | Lee et al. | ................. | 375/240.11 |
| 5,675,387 A * | 10/1997 | Hoogenboom et al. | . | 375/240.15 |
| 6,144,763 A * | 11/2000 | Ito | ................. | 382/166 |
| 6,317,819 B1 * | 11/2001 | Morton | .......................... | 712/22 |
| 6,654,418 B2 * | 11/2003 | Haskell et al. | ............ | 375/240.03 |
| 6,661,427 B1 * | 12/2003 | MacInnis et al. | ............. | 345/660 |
| 6,952,448 B2 * | 10/2005 | Kawai et al. | ............. | 375/240.12 |
| 7,446,774 B1 * | 11/2008 | MacInnis et al. | ............. | 345/519 |
| 2002/0003576 A1 * | 1/2002 | Konishi et al. | ................ | 348/232 |

* cited by examiner

*Primary Examiner* — Anner Holder
(74) *Attorney, Agent, or Firm* — Sterne, Kessler, Goldstein & Fox PLLC

(57) ABSTRACT

In a video processing system, a method and system for dynamically configurable DCT/IDCT module in a wireless handset are provided. A processor may be used to configure a quantization scheme and video format mode of operation and to configure a processing network in a DCT/IDCT module. The mode of operation may depend on whether the received video signal is in JPEG, MPEG, and/or H.263 format. The processing network may be configured into a DCT processing network configuration or an IDCT processing network configuration based on whether the received video signal is to be encoded or decoded respectively. The DCT/IDCT module may comprise a FIFO, an adder/subtractor, a multiplier/accumulator, a plurality of digital dividers, and a de-quantizer. The plurality of digital dividers may comprise a 12-bit divider and an 7-bit divider. The mode and configuration modifications may be dynamically performed during operation of the wireless handset.

36 Claims, 11 Drawing Sheets

METHOD AND SYSTEM FOR DYNAMICALLY CONFIGURABLE DCT/IDCT MODULE IN A WIRELESS HANDSET

CROSS-REFERENCE TO RELATED APPLICATIONS/INCORPORATION BY REFERENCE

This application makes reference to, claims priority to, and claims the benefit of United States Provisional Application Ser. No. 60/581,150, entitled "Method and System for Dynamically Configurable DCT/IDCT Module in a Wireless Handset," filed on Jun. 18, 2004.

The above stated application is hereby incorporated herein by reference in its entirety.

FIELD OF THE INVENTION

Certain embodiments of the invention relate to the processing of communication signals. More specifically, certain embodiments of the invention relate to a method and system for a dynamically configurable DCT/IDCT module in a wireless handset.

BACKGROUND OF THE INVENTION

In wireless handsets or wireless devices, the growing computational complexity and data rate requirements of new multimedia applications demand that signal processing systems in these devices provide efficient and flexible compression and decompression operations for transmission of still images and/or video signals over wireless communication networks and/or links. The transmission may be based on a plurality of video coding and decoding standards, and the signal processing system may have to be flexible enough to implement at least one of these standards for the wireless device to use. Examples of video coding and decoding (codec) standards that may be used in wireless handsets comprise Joint Photographic Experts Group (JPEG), Moving Picture Experts Group (MPEG), and H.263 standard published by the International Telecommunications Union (ITU).

The JPEG standard is a lossy compression of still images based on the discrete cosine transform (DCT) and the inverse cosine transform (IDCT) for coding and decoding operations respectively. The JPEG standard is rarely used in video, but it forms the basis for motion-JPEG (M-JPEG) which may be used in desktop video editing and digital video (DV) compression, a compression and data packing scheme used in consumer digital video cassette recorders and their professional derivatives.

In the JPEG standard an 8×8 array of sample data known as a video data block may be used for processing, where the sample data may correspond to luminance (Y) or chrominance (Cr and Cb) information of the still image or video signal. Four 8×8 blocks of luminance, an 8×8 block of Cr, and an 8×8 block of Cb data is known in JPEG terminology as a minimum coded unit (MCU) and it corresponds to a macroblock in DV or MPEG terminology.

The MPEG standard is also based on the DCT/IDCT pair and may provide intraframe or interframe compression. In interframe compression, there may be an anchor or self-contained image in a video field that provides a base value and succeeding images may be coded based on their differences to the anchor. In intraframe compression, each image in a video field is compressed or coded independently from any other image in a video sequence. The MPEG standard specifies what may constitute a legal bitstream, that is, it provides guidelines as to what is a conformant encoder and decoder but does not standardize how an encoder or a decoder may accomplish the compression or decompression operations respectively.

The H.263 standard may support video coding and decoding for video-conferencing and video-telephony application. Video-conferencing and video-telephony may have a wide range of wireless and wireline applications, for example, desktop and room based conferencing, video over the Internet and over telephone lines, surveillance and monitoring, telemedicine, and computer-based training and education. Like MPEG, the H.263 standard specifies the requirements for a video encoder and decoder but does not describe the encoder and decoder themselves. Instead, the H.263 standard specifies the format and content of the encoded bitstream. Also like MPEG and JPEG, the H.263 standard is also based on the DCT/IDCT pair for coding and decoding operations.

The encoding and decoding operations specified by the JPEG, MPEG, and H.263 standards may be implemented in software to be run on signal processing integrated circuits (IC) with embedded processors such as systems-on-a-chip (SOC). However, processor-based SOC devices where these operations may run efficiently are proving difficult to implement. This difficulty arises because system software and/or other data processing applications executed on the embedded processor demand a large portion of the computing resources available on the SOC, limiting the ability of the coding and decoding operations to be performed as rapidly as may be required for a particular data transmission rate.

The use of embedded digital signal processors (DSP) in an SOC design may provide the increased computational speed needed to execute coding and decoding software. However, this approach may prove to be costly because an embedded DSP is a complex hardware resource that may require a large portion of the area available in an SOC design. Moreover, additional processing hardware, for example an embedded processor or a microcontroller, may still be required to provide system level control and/or other functions for the signal processing IC. A solution that requires a relatively small area in an SOC and that is computationally efficient and operationally flexible for performing coding and decoding operations remains an important challenge in the design of signal processing ICs for multimedia applications in wireless handsets.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for a dynamically configurable DCT/IDCT module in a wireless handset. Aspects of the method may comprise determining a quantization scheme and video format mode of operation in a DCT/IDCT module for processing a received video signal. A DCT/IDCT module may be configured to form a processing network configuration based on whether the received video signal is to be encoded or decoded. The received video signal may be processed based on the determined video format mode of operation and the configured processing network in the DCT/IDCT module. The DCT/IDCT module may be configured into a DCT processing network configuration when the received video signal is to be encoded, or into an IDCT processing network configuration when the received video signal is to be decoded or to be re-constructed during encoding process. The received video signal may be stored into a memory after processing.

The method may comprise determining whether the video format mode of operation is JPEG, MPEG, or H.263 video format. Programming JPEG luminance quantization values, JPEG chrominance quantization values, MPEG intraframe quantization values, and/or MPEG interframe quantization values may be performed before and/or during operation. The method may further comprise determining an MPEG luminance DC scaling factor and an MPEG chrominance DC scaling factor based on a quantization parameter.

Aspects of the system may comprise at least one processor that determines a quantization scheme and video format mode of operation in a DCT/IDCT module for processing a received video signal. The processor may configure the DCT/IDCT module to form a processing network configuration based on whether the received video signal is to be encoded or decoded. The DCT/IDCT module may process the received video signal based on the determined video format mode of operation and the configured processing network in the DCT/IDCT module.

The processor may configure the DCT/IDCT module into a DCT processing network configuration when the received video signal is to be encoded or into an IDCT processing network configuration when the received video signal is to be decoded. The processing elements in the DCT/IDCT module may comprise a buffer, an adder/subtractor, a multiplier/accumulator, a plurality of digital dividers, and a de-quantizer. The received video signal may be stored into a memory after processing.

The processor may determine whether the video format mode of operation is JPEG, MPEG, or H.263 video format. Programming JPEG luminance quantization values, JPEG chrominance quantization values, MPEG intraframe quantization values, and/or MPEG interframe quantization values may be performed by the processor before and/or during operation. The processor may determine an MPEG luminance DC scaling factor and an MPEG chrominance DC scaling factor based on a quantization parameter.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a dynamically configurable DCT/IDCT module in a wireless handset. A DCT/IDCT module may be configured to efficiently encode and decode video signals in at least one of a plurality of video formats. This approach may allow a system processor and/or a dedicated digital signal processor to perform other data processing functions and/or system level control functions while the DCT/IDCT module performs the computationally intensive encoding and decoding operations. Utilizing a DCT/IDCT module may provide the added computational resources needed to support video signal processing at the desired frame rates.

Figure 1A:
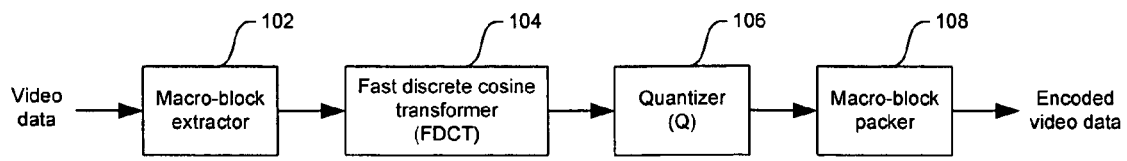
FIG. 1A is a block diagram of an exemplary JPEG encoding operation, in accordance with an embodiment of the invention.

FIG. 1A is a block diagram of an exemplary JPEG encoding operation, in accordance with an embodiment of the invention. Referring to FIG. 1A, a JPEG encoding operation may comprise a macro-block extractor 102, a fast discrete cosine transformer (FDCT) 104, a quantizer (Q) 106, and a macro-block packer 108. The macro-block extractor 102 may comprise logic, circuitry, and/or code and may be adapted to extract video data blocks of luminance and chrominance information from the video data macroblocks for processing. The FDCT 104 may comprise logic, circuitry, and/or code and may be adapted to determine the spatial frequency components of the video data blocks. The quantizer 106 may comprise logic, circuitry, and/or code and may be adapted to quantize and remove spatial frequency components with low quantized values. The macro-block packer 108 may comprise logic, circuitry, and/or code and may be adapted to prepare the video data from the quantizer 106 into video data macroblocks.

The JPEG encoding operation in FIG. 1A may be implemented in hardware so that the video data blocks extracted by the macro-block extractor 102 may be represented in, for example, 64 samples of un-signed 8-bit data. The spatial frequency components produced by the FDCT 104 may be represented in, for example, 64 samples of signed 9-bit data.

The output of the quantizer 106 may be represented in, for example, 64 samples of signed 9-bit data.

For uniform handling of different image or video components, the FDCT 104 may require that the expected average value for all the pixels be zero. Therefore, it may be necessary that before the function provided by the FDCT 104 is performed, a value of 128, for example, may be subtracted from each pixel (for 8-bit unsigned normally ranging from 0 to 255) to shift it to a range of −127 to 127. This offset may have no effect on the AC characteristics of the image block or macro-block.

Figure 1B:
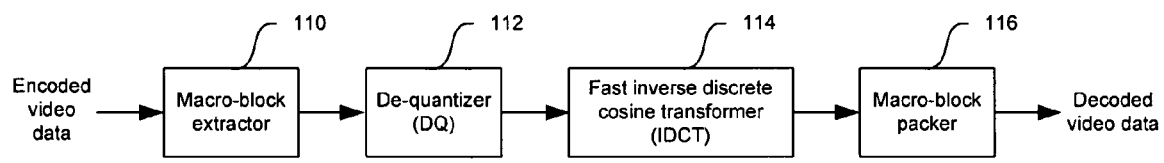
FIG. 1B is a block diagram of an exemplary JPEG and MPEG decoding operation, in accordance with an embodiment of the invention.

FIG. 1B is a block diagram of an exemplary JPEG and MPEG decoding operation, in accordance with an embodiment of the invention. Referring to FIG. 1B, a JPEG and MPEG decoding operation may comprise a macro-block extractor 110, a de-quantizer (DQ) 112, a fast inverse discrete cosine transformer (IDCT) 114, and a macro-block packer 116. The macro-block extractor 110 may comprise logic, circuitry, and/or code and may be adapted to extract blocks of encoded luminance and chrominance information from the video data macroblocks. The de-quantizer 112 may comprise logic, circuitry, and/or code and may be adapted to de-quantize the encoded spatial frequency components of the video data. The IDCT 114 may comprise logic, circuitry, and/or code and may be adapted to determine the decoded video data from the de-quantized spatial frequency components received from the de-quantizer 112. The macro-block packer 116 may comprise logic, circuitry, and/or code and may be adapted to prepare the decoded video data from the IDCT 114 into video data macroblocks. The JPEG and MPEG decoding operations shown in FIG. 1B may also be used for other still picture and video standards.

The JPEG and MPEG decoding operation in FIG. 1B may be implemented in hardware so that the video data blocks extracted by the macro-block extractor 110 may be represented in, for example, 64 samples of signed 9-bit data. The output of the de-quantizer 112 may be represented in, for example, 64 samples of signed 11-bit data. The output of the IDCT 114 may be represented in, for example, 64 samples of signed 9-bit data for MPEG and 64 samples of unsigned 8-bit data for JPEG.

Figure 1C:
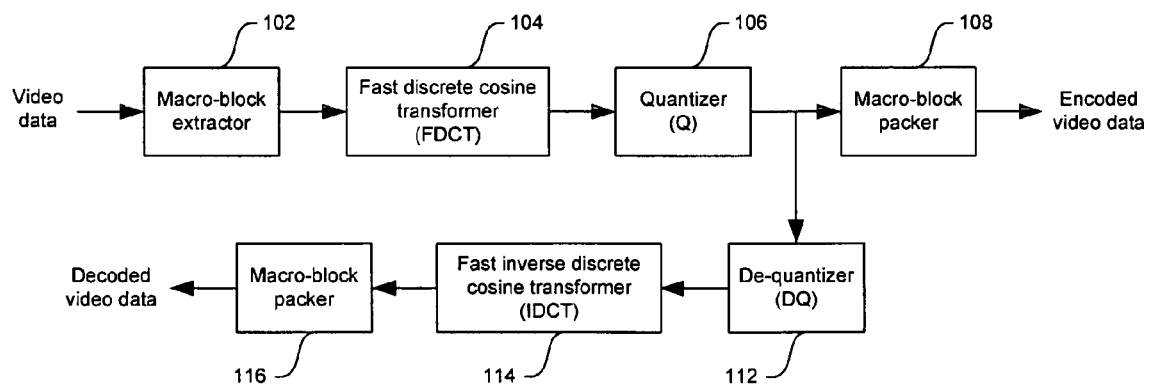
FIG. 1C is a block diagram of an exemplary MPEG encoding operation, in accordance with an embodiment of the invention.

FIG. 1C is a block diagram of an exemplary MPEG encoding operation, in accordance with an embodiment of the invention. Referring to FIG. 1C, an MPEG encoding operation may comprise the macro-block extractor 102, the FDCT 104, the quantizer 106, and the macro-block 108. Because MPEG and other video encoding standards may, in some instances, implement predictive coding, it may be necessary to compare the current video data being processed with the decoded version of the encoded video data. For this reason, the MPEG encoding operation in FIG. 1C may also comprise the de-quantizer 112, the IDCT 114, and the macro-block packer 116.

The MPEG encoding operation in FIG. 1C may be implemented in hardware so that the video data blocks extracted by the macro-block extractor 102 may be represented in, for example, 64 samples of signed 9-bit data. The spatial frequency components produced by the FDCT 104 may be represented in, for example, 64 samples of signed 11-bit data. The output of the quantizer 106 may be represented in, for example, 64 samples of signed 9-bit data. The implementation of the feedback path provided by the de-quantizer 112, the IDCT 114, and the macro-block packer 116 may be, for example, similar to that presented in FIG. 1B.

Because the functions performed by the FDCT 104, the quantizer 106, the de-quantizer 112, and the IDCT 114 may require a large number of computations, a single hardware module or an array of identical parallel hardware modules comprising these functions may be an effective solution that addresses the limitations that arise from a software-only approach to encoding and decoding operations on an SOC. Implementing these functions on a small and flexible hardware module in the SOC may provide the computational speed that may be required by multimedia applications without the need for a large hardware accelerator or embedded DSP.

Figure 2:
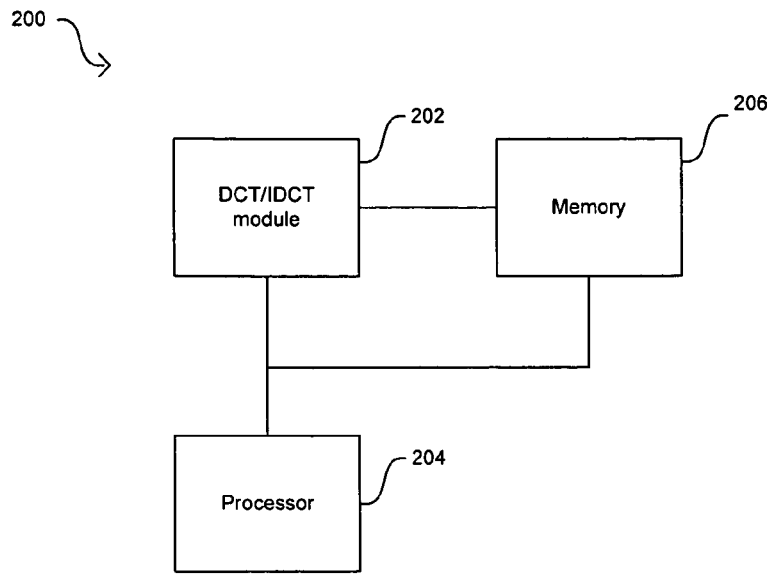
FIG. 2 is a block diagram of an exemplary video coding and encoding system, in accordance with an embodiment of the invention.

FIG. 2 is a block diagram of an exemplary video coding and encoding system, in accordance with an embodiment of the invention. Referring to FIG. 2, the SOC image processing system 200 may comprise a DCT/IDCT module 202, a processor 204, and a memory 206. The DCT/IDCT module 202 may comprise logic, circuitry, and/or code and may be adapted to perform the encoding operation of the FDCT 104 and the quantizer 106 and the decoding operation of the de-quantizer 112 and the IDCT 114. The DCT/IDCT module 202 may provide encoding and decoding operations for a plurality of video format modes of operation. The DCT/IDCT module 202 may provide encoding and decoding operations for a macro-block of video data and/or for a block of video data.

The processor 204 may comprise logic, circuitry, and/or code and may be adapted to perform system level control functions, additional image processing functions and/or operations, transfer video data, encoded video data, decoded video data, and/or intermediate values determined during encoding and decoding computations, and to modify the operation of the DCT/IDCT module 202. The memory 206 may comprise logic, circuitry, and/or code and may be adapted to store video data, encoded video data, decoded video data, intermediate values determined during encoding computations, and/or control information that may be used to modify the operation of the DCT/IDCT module 202.

In operation, the DCT/IDCT module 202 may receive video data blocks or macroblocks for encoding and decoding operations. During the encoding operation, after the DCT transform coding of each 8×8 video data block, the resulting DCT coefficients or spatial frequencies of each 8×8 block may be quantized. An 8×8 quantization matrix may be used to reduce the amplitude of the DCT coefficients and to increase the number of zero-value coefficients. In JPEG format, for example, up to 4 quantization matrices may be utilized. Table 1 and Table 2 provide a list of exemplary quantization values for default luminance and chrominance quantization matrices.

TABLE 1

JPEG default luminance quantization matrix.

| 16 | 11 | 10 | 16 | 24  | 40  | 51  | 61  |
|----|----|----|----|-----|-----|-----|-----|
| 12 | 12 | 14 | 19 | 26  | 58  | 60  | 55  |
| 14 | 13 | 16 | 24 | 40  | 57  | 69  | 56  |
| 14 | 17 | 22 | 29 | 51  | 87  | 80  | 62  |
| 18 | 22 | 37 | 56 | 68  | 109 | 103 | 77  |
| 24 | 35 | 55 | 64 | 81  | 104 | 113 | 92  |
| 49 | 64 | 78 | 87 | 103 | 121 | 120 | 101 |
| 72 | 92 | 95 | 98 | 112 | 100 | 103 | 99  |

TABLE 2

JPEG default chrominance quantization matrix.

| 17 | 18 | 24 | 47 | 99 | 99 | 99 | 99 |
|----|----|----|----|----|----|----|----|
| 18 | 21 | 26 | 66 | 99 | 99 | 99 | 99 |
| 24 | 26 | 56 | 99 | 99 | 99 | 99 | 99 |

TABLE 2-continued

JPEG default chrominance quantization matrix.

| 47 | 66 | 99 | 99 | 99 | 99 | 99 | 99 |
| 66 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |

A quality scaling quantization factor may be used together with the default quantization matrix to provide more flexibility in the encoding operation between the quality of the image and the compression or encoding ratio. For example, in JPEG format, the quality scaling factor may range, for example, between 0.5 to 5, where 5 may represent the highest compression, whereas for MPGE4 video format the quality scaling quantization factor may range, for example, from 1 to 31.

For JPEG format, since the image is a still picture, the quantization and reverse quantization may be carried out by scaling down the DCT coefficients or scaling up the IDCT coefficients respectively. For example, for quantization, $$Q(DCT(i,j)) = \text{round}\left[\frac{DCT(i,j)}{q(i,j)}\right], \text{ and}$$

for de-quantization, $$DQ(IDCT(i,j)) = IDCT(i,j) \times q(i,j),$$

where $q(i,j)$ is the quantization value that corresponds to each of the DCT and IDCT coefficients and round[x] is a function that rounds the value x to its nearest integer. For example, round[3.6]=4, round[3.2]=3, round[-2.3]=-2, and round[-2.7]=-3.

During operation in MPEG4 video format, the DCT/IDCT module 202 may utilize a matrix based quantization scheme or H.263 quantization scheme, while for H.263 video format, the DCT/IDCT module 202 may utilize a simple uniform quantization scheme. Both schemes may use the quantization parameter QP to adjust quantization level. The parameter QP may take, for example, integer values that range from 1 to 31. Uniform quantization with step size of, for example, 2*QP may be used for H.263 Quanitization scheme. For MPEG4, when a matrix based quantization scheme is used, then each coefficient may be first individually quantized by the quantization factor shown in Table 3 and Table 4. The quantized results are then further quantized by the parameter QP.

TABLE 3

MPEG4 intraframe quantization matrix, MQ_intra(i, j)

| 8 | 17 | 18 | 19 | 21 | 23 | 25 | 27 |
| 17 | 18 | 19 | 21 | 23 | 25 | 27 | 28 |
| 20 | 21 | 22 | 23 | 24 | 26 | 28 | 30 |
| 21 | 22 | 23 | 24 | 26 | 28 | 30 | 32 |
| 22 | 23 | 24 | 26 | 28 | 30 | 32 | 35 |
| 23 | 24 | 26 | 28 | 30 | 32 | 35 | 38 |
| 25 | 26 | 28 | 30 | 32 | 35 | 38 | 41 |
| 27 | 28 | 30 | 32 | 35 | 38 | 41 | 45 |

TABLE 4

MPEG4 interframe quantization matrix, MQ_inter(i, j).

| 16 | 17 | 18 | 19 | 20 | 21 | 22 | 23 |
| 17 | 18 | 19 | 20 | 21 | 22 | 23 | 24 |

TABLE 4-continued

MPEG4 interframe quantization matrix, MQ_inter(i, j).

| 18 | 19 | 20 | 21 | 22 | 23 | 24 | 25 |
| 19 | 20 | 21 | 22 | 23 | 24 | 26 | 27 |
| 20 | 21 | 22 | 23 | 25 | 26 | 27 | 28 |
| 21 | 22 | 23 | 24 | 26 | 27 | 28 | 30 |
| 22 | 23 | 24 | 26 | 27 | 28 | 30 | 31 |
| 23 | 24 | 25 | 27 | 28 | 30 | 31 | 33 |

In the H.263 quantization scheme, the quantization values may be determined by $$q(i,j) = \begin{cases} 8 & i=0, j=0 \\ 2*QP & \text{else} \end{cases},$$

where the q(0,0) quantization value corresponds to the DC spatial frequency value. In the case of an intraframe DC component, the quantization and de-quantization of the DCT and IDCT coefficients may be determined by $$Q(DCT(0,0)) = \text{round}\left[\frac{DCT(0,0)}{q(0,0)}\right],$$

$$DQ(IDCT(0,0)) = IDCT(0,0) \times q(0,0).$$

For the remaining AC components or spatial frequencies in the H.263 quantization scheme, that is, when $i \neq 0$ or $j \neq 0$, the intraframe quantization may be $$Q(DCT) = \min(\max(-127, \text{sign}(DCT(i,j))*DCT(i,j)|/q(i,j)), 127)$$

where sign[x] returns the sign of the number x; the interframe quantization may be determined by $$Q(DCT(i,j)) = \min(\max(-127, \text{sign}(DCT(i,j))*(DCT(i,j)|-QP/2)/q(i,j)), 127)'$$

where clipping to [-127: 127] may be performed for all coefficients with the exception of the intraframe DC component.

For the H.263 quantization scheme, the de-quantization in the decoding operation may be determined by $$DQ(IDCT(i,j))=0, \text{ when } IDCT(i,j)=0, \text{ or else by}$$

$$DQ(DCT(i,j)) = \min(\max(-2048, \text{sign}(IDCT(i,j))* (|IDCT(i,j)|*q(i,j)+quan\_add)), 2047)'$$

where the parameter quan_add=QP when QP is odd and quan_add=QP-1 when QP is even. Clipping to [-2048:2047] may be performed before the IDCT coefficients are computed.

For a matrix-based quantization scheme, the intraframe DC quantization for the luminance component Y may be performed by first determining the scaling factor DC_Scale (QP)

$$DC\_Scale(QP) = \begin{cases} 8 & \text{when } QP < 5 \\ 2*QP & \text{when } 5 < QP < 9 \\ QP+8 & \text{when } 9 < QP < 25 \\ 2*QP-16 & \text{when } 25 < QP < 32 \end{cases}.$$

For the chrominance components U and V, the DC_Scale (QP) may be determined by $$DC\_Scale(QP) = \begin{cases} 8 & \text{when } QP < 5 \\ (QP+13)/2 & \text{when } 5 < QP < 25 \\ QP-6 & \text{when } 25 < QP < 31 \end{cases}.$$

The quantization values for intraframe DC quantization may be determined by $$q(i, j) = \begin{cases} DC\_Scale(QP) & \text{when } i = 0, j = 0 \\ MQ\_intra(i, j) & \text{when intraframe} \\ MQ\_inter(i, j) & \text{when interframe} \end{cases}$$

Given the quantization values, the intraframe DC quantization may determined by $$Q(DCT(0, 0)) = \text{round}\left[\frac{DCT(0, 0)}{q(0, 0)}\right],$$

$$DQ(IDCT(0, 0)) = \min(\max(-2048, IDCT(i, j) * q(0, 0)), 2047),$$

where the factor A(i,j) is determined by $$A(i,j) = \min(\max(-2048, \text{round}(16*|DCT(i,j)|/q(i,j))), 2047).$$

For the remaining AC components or spatial frequencies, the MPEG4 intraframe quantization may be determined by $$Q(DCT(i,j)) = \min(\max(-127, \text{sign}(DCT(i,j)) * [(A(i,j) + \text{round}[3*QP/4])/(2*QP)]), 127)'$$

while the MPEG4 interframe quantization may be determined by $$Q(DCT(i,j)) = \min(\max(-127, \text{sign}(DCT(i,j))[A(i,j)/(2*QP)]), 127).$$

The MPEG4 intraframe de-quantization may be determined by $$DQ(DCT(i,j)) = \min(\max(-2048, \text{sign}(IDCT(i,j)) * ((|DCT(i,j)| * q(i,j) * QP)/8)), 2047)'$$

while the MPEG4 interframe de-quantization may be determined by $$DQ(DCT(i,j)) = \min(\max(-2048, B(i,j) * ((2*|IDCT(i,j)| + B(i,j)) * q(i,j) * QP)/16), 2047)$$

where the factor B(i,j) may be determined by $$B(i,j) = \text{sign}(IDCT(i,j)).$$

During MPEG4 video format operation of the DCT/IDCT module 202, a mismatch control may be performed prior to de-quantization. The mismatch control may be based, for example, on the sum of all 64 de-quantized values in the case of an 8×8 video data block. For example, when the sum of all the dequantized values is even and the DQ(IDCT(7,7)) is even, then DQ(IDCT(7,7)) is incremented by 1; when the sum of all the dequantized values is even and the DQ(IDCT(7,7)) is odd, then DQ(IDCT(7,7)) is decremented by 1.

To implement the encoding and decoding operations and all their computational steps described hitherto, the architectural design of the DCT/IDCT module 202 may require flexibility in the form of a configurable architecture to operate on video signals in at least one of a plurality of video formats and quantization schemes.

Figure 3:
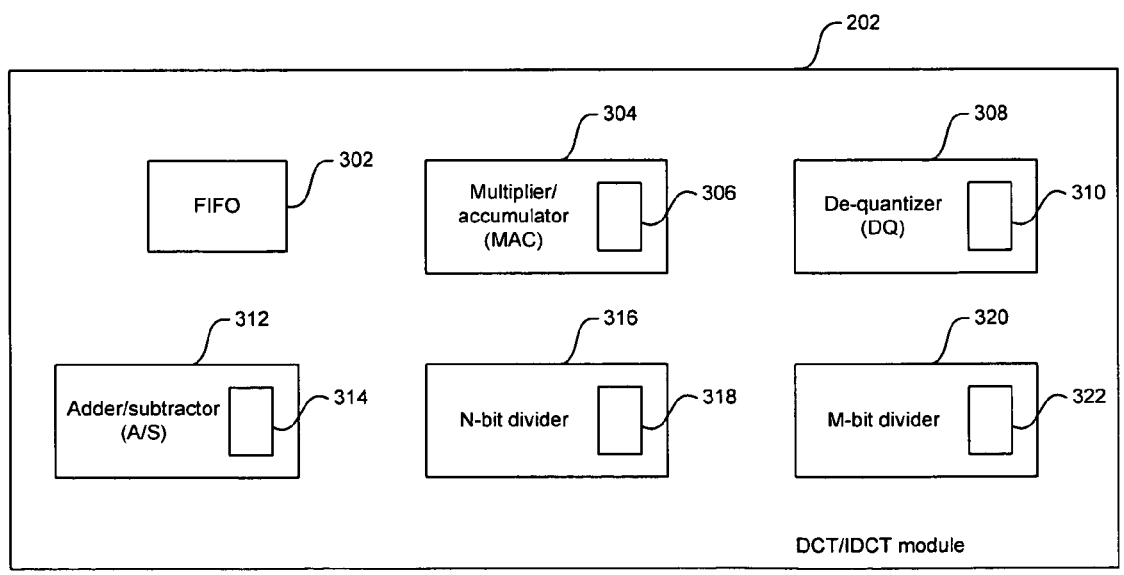
FIG. 3 is a block diagram of exemplary processing elements in a DCT/IDCT module, in accordance with an embodiment of the invention.

FIG. 3 is a block diagram of exemplary processing elements in a DCT/IDCT module, in accordance with an embodiment of the invention. Referring to FIG. 3, the DCT/IDCT module 202 in FIG. 2 may comprise a FIFO 302, a multiplier/accumulator (MAC) 304, a bit-width reduction (BWR) block 306, a de-quantizer (DQ) 308, a BWR block 310, an adder/subtractor (A/S) 312, a BWR block 314, an N-bit divider 316, a BWR block 318, an M-bit divider 320, and a BWR block 322. The operation and configuration of these processing elements may be determined and modified by the processor 204 in FIG. 2.

Figure 4A:
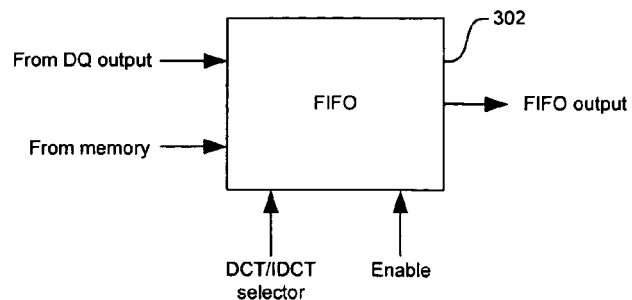
FIG. 4A illustrates an exemplary FIFO, in accordance with an embodiment of the invention.

FIG. 4A illustrates an exemplary FIFO, in accordance with an embodiment of the invention. Referring to FIG. 4A, the FIFO 302 may comprise logic, circuitry, and/or code and may be adapted to buffer and to order video data. The FIFO 302 may be implemented in, for example, an 8-bit circular FIFO configuration. The FIFO 302 may receive video data input from the MAC 304 or from the memory 206 in FIG. 2. The output of the FIFO 302 may be, for example, a 16-bit wide output. The FIFO 302 may receive control signals that modify its operation and/or configuration. For example, a DCT/IDCT selector signal shown in FIG. 4A may be utilized to configure the input to the FIFO 302 depending on whether the video data is to be encoded or decoded by the DCT/IDCT module 202, while an enable signal may be utilized to synchronize the FIFO 302 to at least one of a plurality of clocks. The FIFO 302 may not be limited to the inputs and/or control signals shown in FIG. 4A.

Figure 4B:
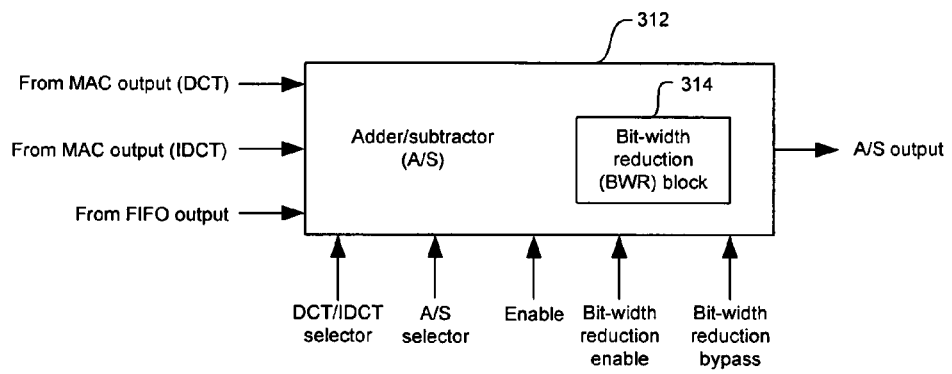
FIG. 4B is a block diagram an exemplary adder/subtractor with a bit-width reduction block, in accordance with an embodiment of the invention.

FIG. 4B is a block diagram of an exemplary adder/subtractor with a bit-width reduction block, in accordance with an embodiment of the invention. Referring to FIG. 4B, the A/S 312 may comprise logic, circuitry, and/or code and may be adapted to perform digital addition or digital subtraction. The A/S 312 may receive video data from the MAC 304 or from the output of the FIFO 302. There may be two inputs from the MAC 304; one for when the output of the MAC 304 results when the DCT/IDCT module 202 is encoding video data and another for when the DCT/IDCT module 202 is decoding video data. The output of the A/S 312 may be, for example, a 16-bit wide output.

The A/S 312 may receive control signals that modify its operation and/or configuration. For example, a DCT/IDCT selector signal shown in FIG. 4B may be utilized to configure the input to the A/S 312 depending on whether the video data is to be encoded or decoded by the DCT/IDCT module 202. An A/S selector signal may be utilized to determine whether the A/S 312 is to perform addition or subtraction. An enable and a bit-width reduction enable may be utilized to synchronize the A/S 312 and the BWR block 314 to at least one of a plurality of clocks respectively. A bit-width reduction bypass signal may be utilized to bypass the BWR block 314 in certain network processing configurations. The A/S 312 may not be limited to the inputs and/or control signals shown in FIG. 4B.

The A/S 312 may comprise a BWR block 314. The BWR block 314 may comprise logic, circuitry, and/or code and may be adapted to convert the result from the digital addition or from the digital subtraction to at least one of a plurality of bit-width number representations. For example, the bit-width may be 8, 9, 10, or 11 bits and the number may be in signed or unsigned representation. The BWR block 314 may be implemented as a hardware resource that is part of the A/S 312 or it may implemented as a hardware resource that is separate but coupled to the A/S 312.

Figure 4C:
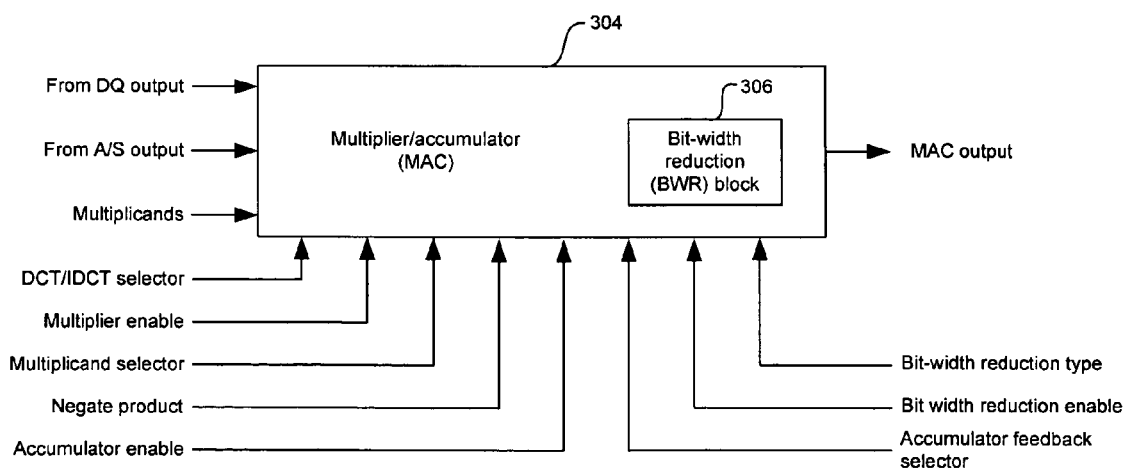
FIG. 4C is a block diagram an exemplary multiplier/accumulator with a bit-width reduction block, in accordance with an embodiment of the invention.

FIG. 4C is a block diagram of an exemplary multiplier/accumulator with a bit-width reduction block, in accordance with an embodiment of the invention. Referring to FIG. 4C, the MAC 304 may comprise logic, circuitry, and/or code and may be adapted to perform digital multiplication and accumulation. The MAC 304 may receive video data from the output of the de-quantizer 308, from the output of the A/S 312, and/or from a plurality of multiplicands that may be stored in the memory 206. The output of the MAC 304 may be, for example, a 12-bit wide output.

The MAC 304 may receive control signals that modify its operation and/or configuration. For example, a DCT/IDCT selector signal shown in FIG. 4C may be utilized to configure the input to the MAC 304 depending on whether the video data is to be encoded or decoded by the DCT/IDCT module 202. A multiplier enable signal may be utilized to synchronize the conversion of input video data to magnitude and sign components to at least one of a plurality of clocks. A multiplicand selector signal may be utilized to select at least one of the plurality of multiplicands for the MAC 304. The number of multiplicands may be proportional to the number size of the video data blocks and/or macroblocks. A negate product signal may be utilized to change the sign of the product provided by the MAC 304. An accumulator enable signal may be utilized to synchronize the product accumulation to at least one of a plurality of clocks. An accumulator feedback selector signal may be utilized to select from a plurality of accumulation values and/or no accumulation. At least one of the plurality of accumulation values may be delayed by at least one clock cycle. A bit-width reduction type signal may be utilized to select the bit-width number representation for the output of the MAC 304. A bit-width reduction enable signal may be utilized to synchronize the bit-width number representation conversion to at least one of a plurality of clocks. The MAC 304 may not be limited to the inputs and/or control signals shown in FIG. 4C.

The MAC 304 may comprise a BWR block 306. The BWR block 306 may comprise logic, circuitry, and/or code and may be adapted to convert the result from the digital multiplication and accumulation to at least one of a plurality of bit-width number representations. For example, the bit-width may be 8, 9, 10, 11, or 12 bits and the number may be in signed or unsigned representation. The BWR block 306 may be implemented as a hardware resource that is part of the MAC 304 or it may implemented as a hardware resource that is separate but coupled to the MAC 304. When the BWR 306 is implemented separately but coupled to the MAC 304, the control signals bit-width reduction type and bit-width reduction enable may be received by the separate hardware resource.

Figure 4D:
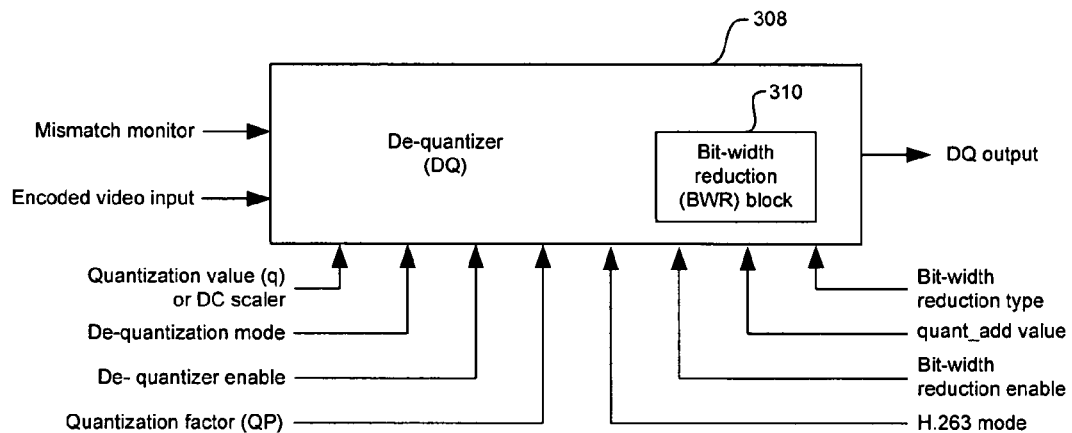
FIG. 4D is a block diagram an exemplary de-quantizer with a bit-width reduction block, in accordance with an embodiment of the invention.

FIG. 4D is a block diagram an exemplary de-quantizer with a bit-width reduction block, in accordance with an embodiment of the invention. Referring to FIG. 4D, the DQ 308 may comprise logic, circuitry, and/or code and may be adapted to perform de-quantization of video data block and/or macroblocks. The DQ 308 may receive video data from the memory 206, from a macro-block extractor, for example, the macro-block extractor 110 in FIG. 1B, and/or from an encoding processing element, for example, the quantizer (Q) 106 in FIG. 1C. The output of the DQ 308 may be, for example, a 16-bit wide output.

The DQ 308 may receive control signals that modify its operation and/or configuration. For example, a mismatch monitor signal may be utilized to perform mismatch control prior to the de-quantization of encoded video data. A quantization factor (QP) and a quantization value (q) or DC_scaler signals may be utilized to provide the DQ 308 with the current values of parameters QP, q, and/or DC_scale to perform H.263 and MPEG4 de-quantization. A de-quantization mode signal may be utilized to select the video format mode of operation for the DQ 308. A de-quantizer enable signal may be utilized to synchronize a plurality of computation steps within the DQ 308 to at least one of a plurality of clocks. A quant_add value and an H.263 mode signals may be used to provide the DQ 308 with the quant_add parameter for H.263 de-quantization. A bit-width reduction type signal may be utilized to select the bit-width number representation for the output of the DQ 308. A bit-width reduction enable signal may be utilized to synchronize the bit-width number representation conversion to at least one of a plurality of clocks. The DQ 308 may not be limited to the inputs and/or control signals shown in FIG. 4D.

The DQ 308 may comprise a BWR block 310. The BWR block 310 may comprise logic, circuitry, and/or code and may be adapted to convert the result from the de-quantization to at least one of a plurality of bit-width number representations. For example, the bit-width may be 8, 9, 10, or 11 bits and the number may be in signed or unsigned representation. The BWR block 310 may be implemented as a hardware resource that is part of the DQ 308 or it may implemented as a hardware resource that is separate but coupled to the DQ 308. When the BWR 310 is implemented separately but coupled to the DQ 308, the control signals bit-width reduction type and bit-width reduction enable may be received by the separate hardware resource.

Figure 4E:
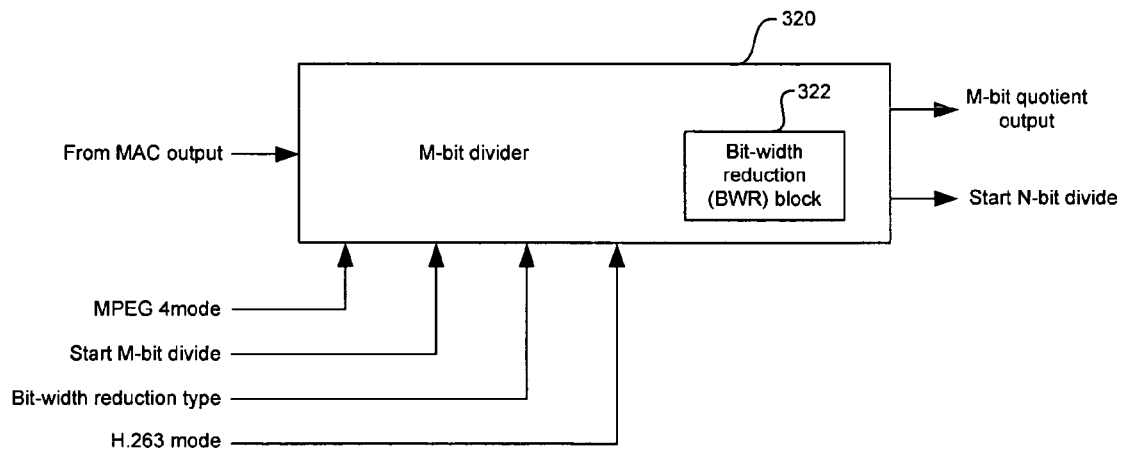
FIG. 4E is a block diagram an exemplary M-bit divider with a bit-width reduction block, in accordance with an embodiment of the invention.

FIG. 4E is a block diagram an exemplary M-bit divider with a bit-width reduction block, in accordance with an embodiment of the invention. Referring to FIG. 4E, the M-bit divider 320 may comprise logic, circuitry, and/or code and may be adapted to perform M-bit digital division. For example, the M-bit divider 320 may be implemented to perform 12-bit digital division. The M-bit divider 320 may receive video data from the MAC 304. The output of the M-bit divider 320 may be, for example, an 8-bit wide output. The M-bit divider 320 may provide a start N-bit divide signal that may be transferred to the N-bit divider 316.

The M-bit divider 320 may receive control signals that modify its operation and/or configuration. For example, in an MPEG4 mode and an H.263 mode, signals may be utilized to select the video format mode of operation in the M-bit divider 320. A start M-bit divide signal may be utilized to indicate the start of the digital division. The M-bit divider 320 may be implemented to perform digital division in a specified number of clock cycles and the start M-bit divide signal may indicate when the specified number of clock cycles starts/begins. A bit-width reduction type signal may be utilized to select the bit-width number representation for the output of the M-bit divider 320. The M-bit divider 320 may not be limited to the inputs and/or control signals shown in FIG. 4E.

The M-bit divider 320 may comprise a BWR block 322. The BWR block 322 may comprise logic, circuitry, and/or code and may be adapted to convert the result from the M-bit division into at least one of a plurality of bit-width number representations. For example, the bit-width may be 7, 8, 9, or 10 bits and the number may be in signed or unsigned representation. The BWR block 322 may be implemented as a hardware resource that is part of the M-bit divider 320 or it may implemented as a hardware resource that is separate but coupled to the M-bit divider 320. When the BWR 322 is implemented separately but coupled to the M-bit divider 320, the control signal bit-width reduction type may be received by the separate hardware resource.

Figure 4F:
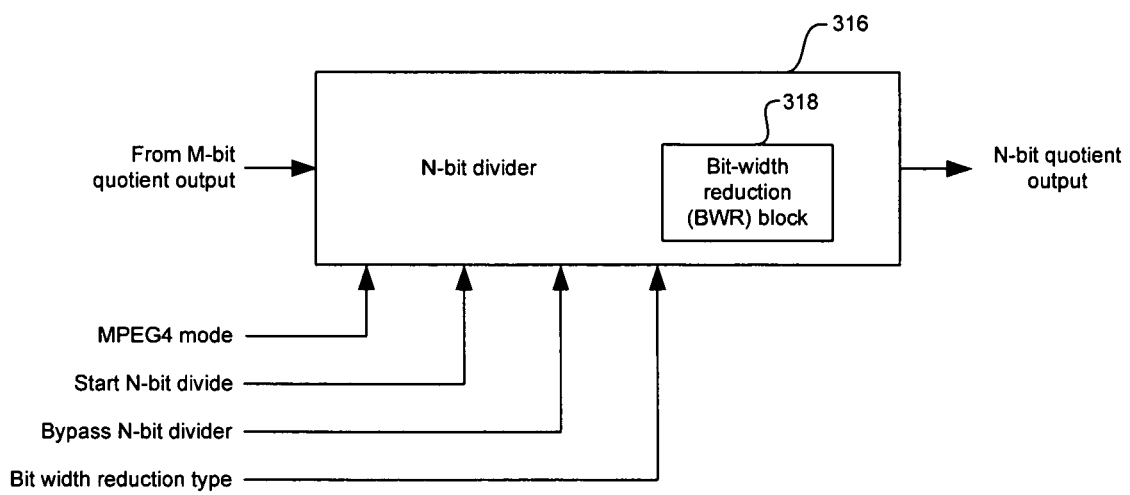
FIG. 4F is a block diagram an exemplary N-bit divider with a bit-width reduction block, in accordance with an embodiment of the invention.

FIG. 4F is a block diagram an exemplary N-bit divider with a bit-width reduction block, in accordance with an embodiment of the invention. Referring to FIG. 4F, the N-bit divider 316 may comprise logic, circuitry, and/or code and may be adapted to perform N-bit digital division. For example, the N-bit divider 316 may be implemented to perform 7-bit digital division. The N-bit divider 316 may receive video data from the M-bit divider 320. The output of the N-bit divider 316 may be, for example, a 9-bit wide output.

The N-bit divider 316 may receive control signals that modify its operation and/or configuration. For example, an MPEG 4 mode signal may be utilized to determine the video format mode of operation of the N-bit divider 316. A start N-bit divide signal may be utilized to indicate the start of the digital division. The N-bit divider 316 may be implemented to perform digital division in a specified number of clock cycles and the start N-bit divide signal may indicate when the specified number of clock cycles starts/begins. A bit-width reduction type signal may be utilized to the select the bit-width number representation for the output of the N-bit divider 316. A bypass N-bit divider signal may be utilized to bypass the operation of the N-bit divider 316 in certain network processing configurations. The N-bit divider 316 may not be limited to the inputs and/or control signals shown in FIG. 4F.

The N-bit divider 316 may comprise a BWR block 318. The BWR block 318 may comprise logic, circuitry, and/or code and may be adapted to convert the result from the N-bit division into at least one of a plurality of bit-width number representations. For example, the bit-width may be 7, 8, 9, or 10 bits and the number may be in signed or unsigned representation. The BWR block 318 may be implemented as a hardware resource that is part of the N-bit divider 316 or it may implemented as a hardware resource that is separate but coupled to the N-bit divider 316. When the BWR 318 is implemented separately but coupled to the N-bit divider 316, the control signal bit-width reduction type may be received by the separate hardware resource.

Figure 5A:
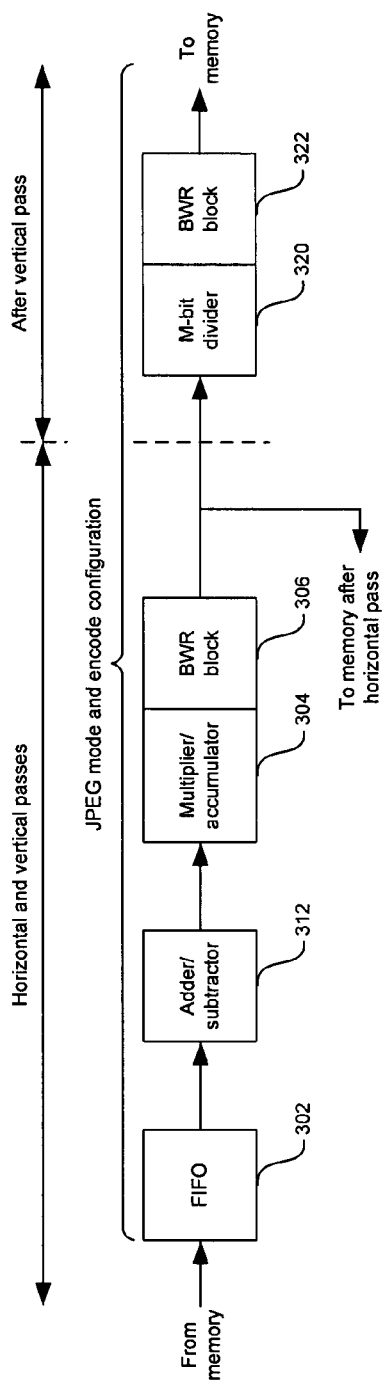
FIGS. 5A-5C illustrate exemplary DCT processing network configurations for JPEG, MPEG, and H.263 video formats, in connection with an embodiment of the invention.
Figure 5B:
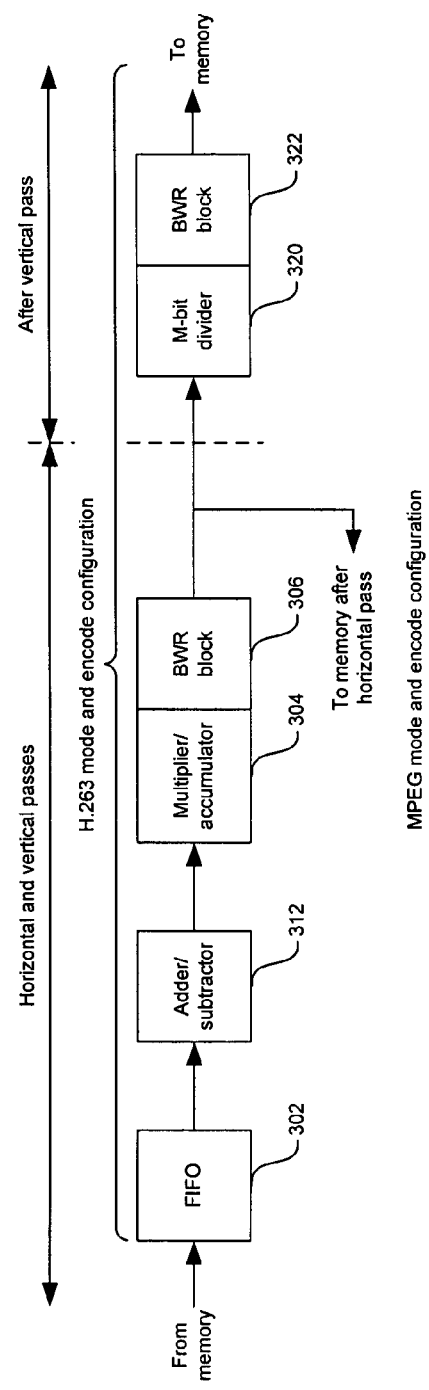
Figure 5C:
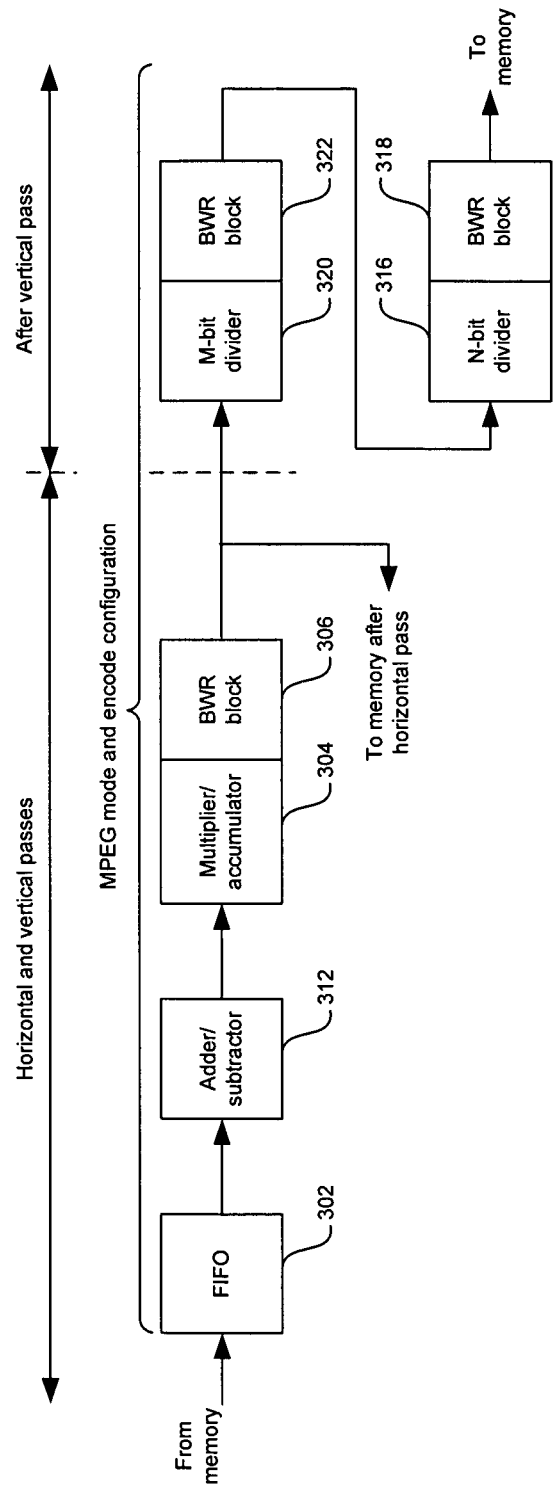

FIGS. 5A-5C illustrate exemplary DCT processing network configurations for JPEG, MPEG, and H.263 video formats or video codec formats, in connection with an embodiment of the invention. Referring to FIG. 5A, the JPEG encoding operation may be implemented by configuring the DCT/IDCT module 202 in a DCT processing network configuration that may comprise the FIFO 302, the A/S 312, the MAC 304, the BWR block 306, the M-bit divider 320, and the BWR block 322. The FIFO 302 may be implemented as an 8-bit circular FIFO. The M-bit divider 320 may be implemented as a 12-bit divider. The BWR block 306 may be configured to provide output rounding and the BWR block 322 may be configured to provide output rounding and clipping. Horizontal and vertical passes may refer to the multiplication and addition functions carried out on rows and columns when determining the encoded video data block or macroblock.

Referring to FIG. 5B, the H.263 encoding operation may be implemented by configuring the DCT/IDCT module 202 in a DCT processing network configuration that may comprise the FIFO 302, the A/S 312, the MAC 304, the BWR block 306, the M-bit divider 320, and the BWR block 322. The FIFO 302 may be implemented as an 8-bit circular FIFO. The M-bit divider 320 may be implemented as a 12-bit divider. The BWR block 306 may be configured to provide output rounding and the BWR block 322 may be configured to provide output rounding and clipping.

Referring to FIG. 5C, the MPEG4 encoding operation may be implemented by configuring the DCT/IDCT module 202 in a DCT processing network configuration that may comprise the FIFO 302, the A/S 312, the MAC 304, the BWR block 306, the M-bit divider 320, the BWR block 322, the N-bit divider 316, and the BWR block 318 The M-bit divider 320 may be implemented as a 12-bit divider and the N-bit divider may be implemented as a 7-bit divider. The FIFO 302 may be implemented as an 8-bit circular FIFO. The BWR 306 may be configured to provide output rounding and the BWR block 322 and the BWR block 318 may be configured to provide output rounding and clipping.

The processor 204 in FIG. 2 may be utilized to configure the DCT network processing configurations shown in FIGS. 5A-5C by configuring the inputs, outputs and/or data processing in at least one of the plurality of processing elements in the DCT/IDCT module 202. The processor 204 may determine when received video data and/or encoded video data may be available to be transferred to and/or from the memory 206.

Figure 6:
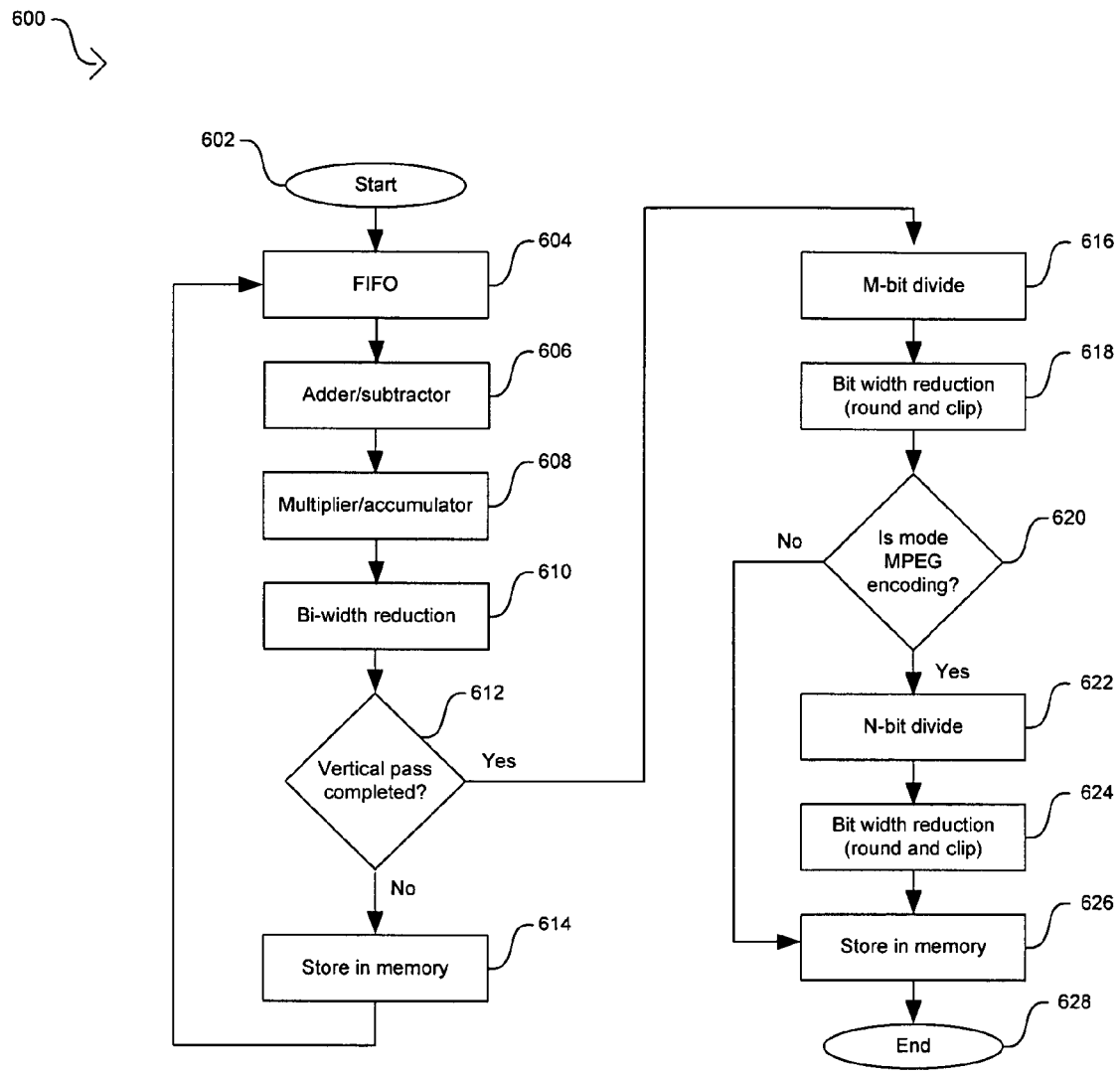
FIG. 6 is a flow chart illustrating exemplary steps for the encoding of video signals utilizing the DCT/IDCT module in a DCT processing network configuration, in accordance with an embodiment of the invention.

FIG. 6 is a flow chart illustrating exemplary steps for the encoding of video signals utilizing the DCT/IDCT module in a DCT processing network configuration, in accordance with an embodiment of the invention. Referring to FIG. 6, in the encoding operation 600, after start step 602, the video data blocks and/or macroblocks may be received by the FIFO 302 from the memory 206 in step 604. In step 606, the A/S 32 may add or subtract the appropriate parameters to perform the encoding function depending on the video format mode of operation. In step 608, the MAC 304 may perform the multiplications and accumulations necessary. In step 610, the BWR block 306 may provide bit-width reduction by rounding the output of the MAC 304. In step 612, the encoding operation 600 may determine whether the current vertical pass completed all vertical passes on the video data block or macroblock. When the current pass is a horizontal pass, intermediate encoding values may be stored in memory in step 614. When the current vertical pass is the last vertical pass, then the final values may be sent to the M-bit divider 320 for, for example, the 12-bit divide function in step 616. When the current vertical pass is not the last vertical pass, then the encoding operation may return to step 604 where video data information from memory may be sent to the FIFO 302.

In step 618, the BWR 322 may provide bit-width reduction by rounding and clipping the output of the M-bit divider 320. In step 620, the DCT/IDCT module 202 may determine whether the DCT network processing configuration provides encoding for MPEG4 matrix-based quantization scheme. When the DCT network processing configuration provides encoding for MPEG4 matrix-based quantization scheme, then the encoding operation 600 may proceed to step 622 where the N-bit divider 316 may provide, for example, a 7-bit digital division. In step 624, the BWR block 318 may provide bit-width reduction by rounding and clipping the results from step 622. The bit-width reduced output from step 624 may be stored into memory in step 626. Returning to step 620, when the DCT network processing configuration provides encoding for JPEG or H.263 video formats, then the encoding operation 600 may proceed to store the results of step 618 into memory in step 626. In step 628, the encoding of the video data block or macroblock is completed and the processing of a new video data block or macroblock may be started.

Figure 7A:
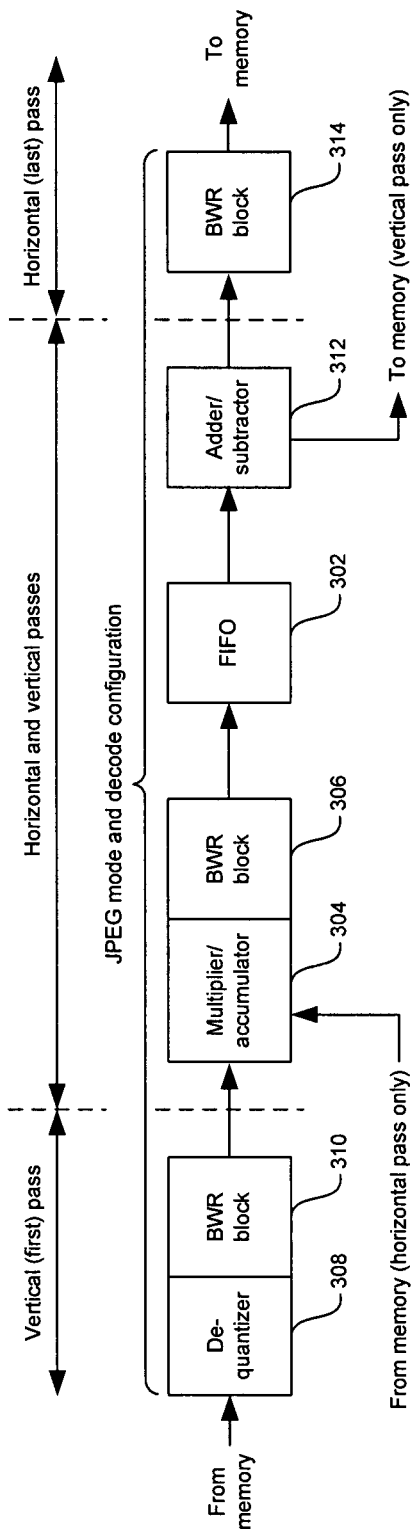
FIGS. 7A-7C illustrate exemplary IDCT processing network configurations for JPEG, MPEG, and H.263 video formats, in connection with an embodiment of the invention.
Figure 7B:
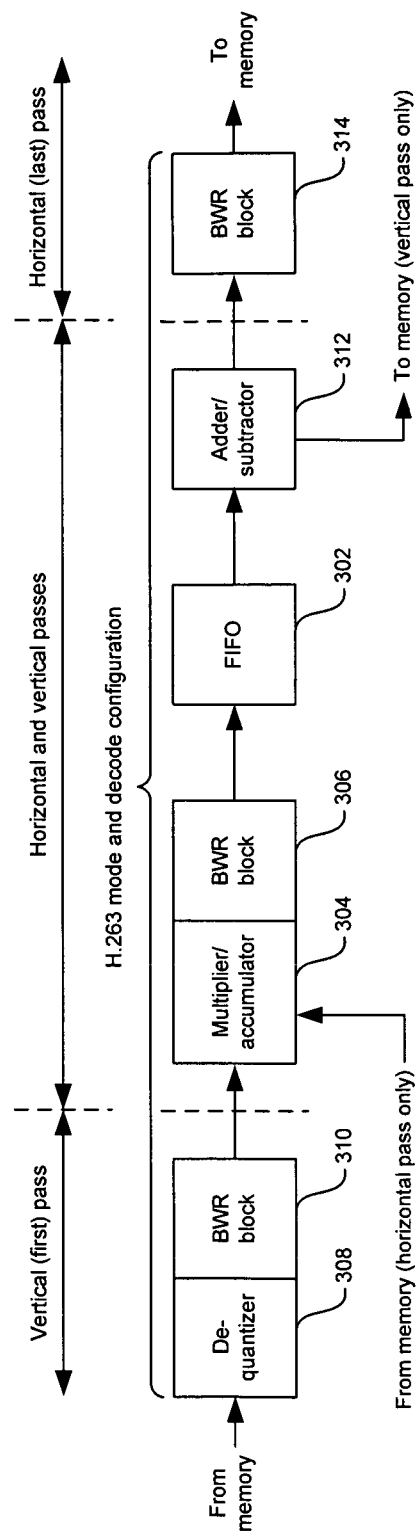
Figure 7C:
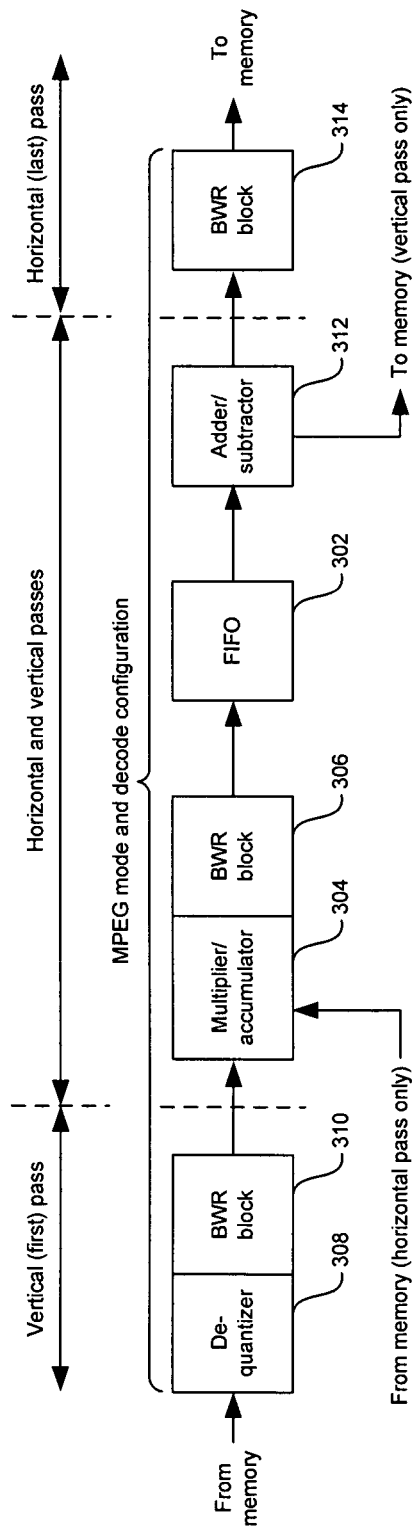

FIGS. 7A-7C illustrate exemplary IDCT processing network configurations for JPEG, MPEG, and H.263 video formats, in connection with an embodiment of the invention. Referring to FIGS. 7A-7C, the JPEG, H.263, and MPEG4 decoding operations may be implemented by configuring the DCT/IDCT module 202 in a DCT processing network configuration that may comprise the DQ 308, the BWR block 310, the MAC 304, the BWR block 306, the FIFO 302, the A/S 312, and the BWR block 314. The FIFO 302 may be implemented as an 8-bit circular FIFO. The BWR block 310 may be configured to provide output clipping, while the BWR block 306 may be configured to provide output rounding and clipping. The BWR block 314 may also be configured to provide output rounding. The DQ 308 may be configured to provide multiplication in a JPEG video format mode of operation. The DQ 308 may be configured to provide multiplication and may utilize the quant_add parameter in an H.263 video format mode of operation. The DQ 308 may be configured to provide multiplication and sign format in an MPEG4 video format mode of operation.

The horizontal and vertical passes indicated in FIGS. 7A-7C may refer to the computations carried out on rows and columns of a macroblock when determining the decoded video data block or macroblock. The DQ 308 and the BWR block 310 may be utilized during the first vertical pass of decoding, while the MAC 304, BWR block 306, FIFO 302, and A/S 312 may be utilized during the following vertical passes and corresponding horizontal passes of decoding. The MAC 304 may receive intermediate results from memory during horizontal passes and the A/S 312 may transfer intermediate results to memory during vertical passes. The BWR block 314 may be utilized during the last horizontal pass of decoding before the final results are transferred to memory.

The processor 204 in FIG. 2 may be utilized to configure the IDCT network processing configurations shown in FIGS. 7A-7C by configuring the inputs, outputs, and/or data processing in at least one of the plurality of processing elements in the DCT/IDCT module 202. The processor 204 may determine when encoded video data and/or decoded video data may be available to be transferred to and/or from the memory 206.

Figure 8:
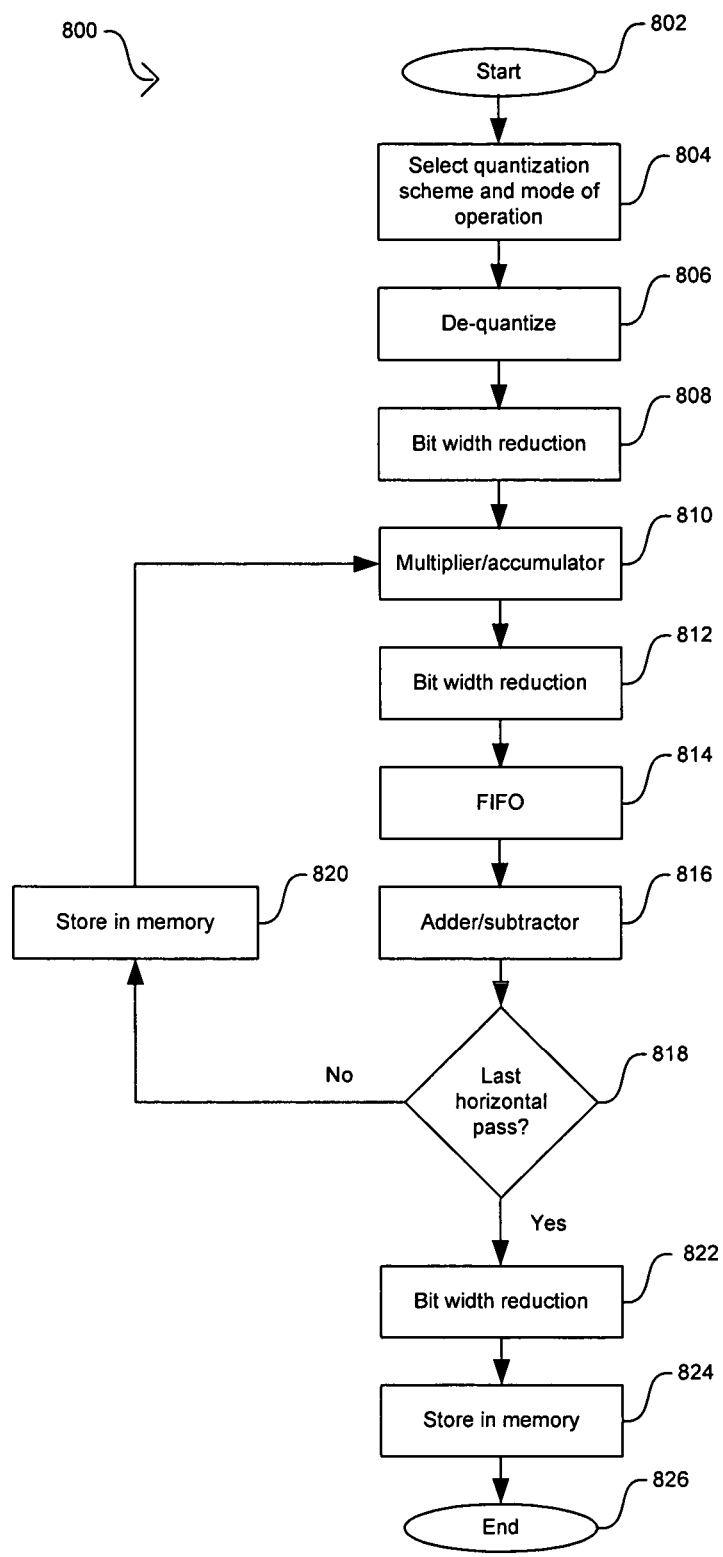
FIG. 8 is a flow chart illustrating exemplary steps for the decoding of video signals utilizing the DCT/IDCT module in a IDCT processing network configuration, in accordance with an embodiment of the invention.

FIG. 8 is a flow chart illustrating exemplary steps for the decoding of video signals utilizing the DCT/IDCT module in a IDCT processing network configuration, in accordance with an embodiment of the invention. Referring to FIG. 8, in the decoding operation 800, after start step 802, the encoded video data blocks or macroblocks may be received by the DQ 308 from memory and the quantization scheme and video format mode of operation may be determined in step 804. The de-quantization operation 806 may implement a JPEG quantization scheme, matrix-based MPEG4 quantization scheme, or H.263 quantization scheme as determined in step 804. The DQ 308 and the BWR block 310 may be configured to operate in the appropriate quantization scheme and video format. In step 808, bit width reduction may be performed in accordance with the quantization scheme and video format determined in step 804. Step 806 and step 808 correspond to the first vertical pass on the encoded video data blocks.

In step 810, the MAC 304 may be utilized to perform vertical or horizontal decoding computations. The results from these computations may be bit-width reduced by the BWR block 306 in step 812 in accordance with the quantization scheme and video format determined in step 804. In step 814, the output from the BWR block 306 may be stored in the FIFO 302. In step 816, the A/S 312 may perform addition or subtraction computations on the output of the FIFO 302. Steps 810 through step 816 correspond to the vertical and horizontal passes on the encoded video data blocks or macroblocks.

In step 818, the decoding operation 800 may determine whether the current horizontal pass completed all horizontal passes on the video data block or macroblock. When the current horizontal pass is not the last pass, the intermediate results on vertical passes may be transferred to the memory module 206 in step 820. These results may be used by the MAC 304 in step 810 for horizontal and vertical processing. When the current horizontal pass is the last pass of the decoding operation, the results of the A/S 312 may be bit-width reduced in step 822 by the BWR block 314 in accordance with the quantization scheme and video format determined in step 804. The block BWR block 314 bypass mode may be disabled when configuring the DCT/IDCT module 202 in an IDCT processing network configuration. In step 824, final results on horizontal passes may be transferred to the memory module 206. In step 826, the decoding of the encoded video data block or macroblock is completed and the processing of a new encoded video data block or macroblock may be started.

The solution provided by the configurable DCT/IDCT module may provide a relatively small area in an processor-based SOC and may be computationally efficient and operationally flexible for performing coding and decoding operations in signal processing ICs for multimedia applications in wireless handsets.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for signal processing, the method comprising:
    performing, by one or more processors and/or circuits integrated within a single chip, functions comprising:
        determining a video codec format mode of operation and a quantization scheme from a plurality of video codec format modes of operation and a plurality of quantization schemes based on a received video signal;
        configuring a processing network according to said determined video codec format mode of operation and quantization scheme and based on whether said received video signal is to be encoded or decoded; and
        processing said received video signal using said configured processing network.

2. The method according to claim 1, said functions comprising configuring said processing network into a DCT processing network configuration when said received video signal is to be encoded.

3. The method according to claim 1, said functions comprising configuring said processing network into an IDCT processing network configuration when said received video signal is to be decoded.

4. The method according to claim 1, said functions further comprising storing said processed received video signal into a memory.

5. The method according to claim 1, said functions further comprising determining whether said determined video codec format mode of operation is associated with a JPEG video codec format, an MPEG video codec format, or an H.263 video codec format.

6. The method according to claim 1, said functions further comprising programming a plurality of JPEG luminance quantization values to be utilized by said processing network.

7. The method according to claim 1, said functions further comprising programming a plurality of JPEG chrominance quantization values to be utilized by said processing network.

8. The method according to claim 1, said functions further comprising programming a plurality of MPEG intraframe quantization values to be utilized by said processing network.

9. The method according to claim 1, said functions further comprising programming a plurality of MPEG interframe quantization values to be utilized by said processing network.

10. The method according to claim 1, said functions further comprising determining an MPEG luminance DC scaling factor based on a quantization parameter.

11. The method according to claim 1, said functions further comprising determining an MPEG chrominance DC scaling factor based on a quantization parameter.

12. A system for signal processing, the system comprising:
one or more processors and/or circuits integrated within a single chip, wherein said one or more processors and/or circuits are operable to:
determine a video codec format mode of operation and a quantization scheme from a plurality of video codec format modes of operation and a plurality of quantization schemes based on a received video signal;
configure a processing network within said single chip according to said determined video codec format mode of operation and quantization scheme and based on whether said received video signal is to be encoded or decoded; and
process said received video signal using said configured processing network.

13. The system according to claim 12, wherein said one or more processors and/or circuits comprise a memory operable to store said processed received video signal.

14. The system according to claim 12, wherein said one or more processors and/or circuits comprise a DCT/IDCT module that comprises a buffer, an adder/subtractor, a multiplier/accumulator, a plurality of digital dividers, and a de-quantizer.

15. The system according to claim 14, wherein said plurality of digital dividers comprise a 12-bit divider and a 7-bit divider.

16. The system according to claim 14, wherein said buffer is an 8-element circular FIFO.

17. The system according to claim 14, wherein said at least one processor one or more processors and/or circuits are operable to configure said DCT/IDCT module into a DCT processing network configuration when said received video signal is to be encoded.

18. The system according to claim 14, wherein said at least one processor one or more processors and/or circuits are operable to configure said DCT/IDCT module into an IDCT processing network configuration when said received video signal is to be decoded.

19. The system according to claim 14, wherein said one or more processors and/or circuits are operable to modify said DCT/IDCT module to operate in said determined video format mode of operation.

20. The system according to claim 14, wherein said one or more processors and/or circuits are operable to program a plurality of JPEG luminance quantization values to be utilized by said DCT/IDCT module.

21. The system according to claim 14, wherein said one or more processors and/or circuits are operable to program a plurality of JPEG chrominance quantization values to be utilized by said DCT/IDCT module.

22. The system according to claim 14, wherein said one or more processors and/or circuits are operable to program a plurality of MPEG intraframe quantization values to be utilized by said DCT/IDCT module.

23. The system according to claim 14, wherein said one or more processors and/or circuits are operable to program a plurality of MPEG interframe quantization values to be utilized by said DCT/IDCT module.

24. The system according to claim 12, wherein said one or more processors and/or circuits are operable to determine an MPEG luminance DC scaling factor based on a quantization parameter.

25. The system according to claim 12, wherein said one or more processors and/or circuits are operable to determine an MPEG chrominance DC scaling factor based on a quantization parameter.

26. An encoding network configuration, the encoding network configuration comprising:
a FIFO;
an adder/subtractor coupled to said FIFO;
a multiplier accumulator coupled to said adder/subtractor;
a first bit width reduction block coupled to said multiplier/accumulator;
an M-bit divider coupled to said first bit width reduction block; and
a second bit width reduction block coupled to said M-bit divider.

27. The encoding network configuration of claim 26, wherein said encoding network configuration receives a video signal for encoding in JPEG video format or H.263 video format.

28. The encoding network configuration of claim 26, wherein said M-bit divider is a 12-bit divider.

29. The encoding network configuration of claim 26, further comprising:
an N-bit divider coupled to said second bit width reduction block; and
a third bit width reduction block coupled to said N-bit width divider.

30. The encoding network configuration of claim 29, wherein said N-bit divider is a 7-bit divider.

31. The encoding network configuration of claim 29, wherein said encoding network configuration receives a video signal for encoding in MPEG video format.

32. An decoding network configuration, the decoding network configuration comprising:
a de-quantizer;
a first bit width reduction block coupled to said de-quantizer;
a multiplier/accumulator coupled to said first bit width reduction block;
a FIFO coupled to said multiplier/accumulator;
a second bit width reduction block coupled to said FIFO;
an adder/subtractor coupled to said second bit width reduction block; and
a third bit width reduction block coupled to said adder/subtractor.

33. The decoding network configuration of claim 32, wherein said decoding network configuration receives a video signal in JPEG, MPEG, or H.263 video format for decoding.

34. The method according to claim 1, wherein each of said plurality of video codec format modes of operation is associated with one or more quantization schemes from said plurality of quantization schemes.

35. The system according to claim 12, wherein each of said plurality of video codec format modes of operation is associated with one or more quantization schemes from said plurality of quantization schemes.

36. An apparatus for signal processing, comprising:
one or more processors and/or circuits integrated within a single chip operable to determine, based on a received video signal, a video codec standard format mode of operation from a plurality of video codec standard format modes of operation supported by the one or more processors and/or circuits integrated within the single chip, each of the plurality of video codec standard format modes of operation having one or more associated quantization schemes;
wherein the one or more processors and/or circuits integrated within the single chip comprise a plurality of modules configured into a network based on the determined video codec standard format mode of operation and based on whether the received video signal is to be encoded or decoded, and
wherein the one or more processors and/or circuits integrated within the single chip are operable to process the received video using the configured network of modules.

* * * * *

UNITED STATES PATENT AND TRADEMARK OFFICE
CERTIFICATE OF CORRECTION

PATENT NO. : 8,861,600 B2  
APPLICATION NO. : 10/890865  
DATED : October 14, 2014  
INVENTOR(S) : Hahm et al.

Page 1 of 1

It is certified that error appears in the above-identified patent and that said Letters Patent is hereby corrected as shown below:

Title page, at the end of Column 2, should read 28 claims instead of 36 claims

In the Claims

Column 18, lines 23-67, please delete claims 26-33.

Signed and Sealed this
First Day of December, 2015

Michelle K. Lee
*Director of the United States Patent and Trademark Office*